United States Patent
De Grijs

(10) Patent No.: US 8,682,070 B2
(45) Date of Patent: Mar. 25, 2014

(54) METHOD TO RESTORE EDGES IN RASTERIZED IMAGES

(71) Applicant: OCE-Technologies B.V., Venlo (NL)

(72) Inventor: Eduard T. H. De Grijs, Venlo (NL)

(73) Assignee: OCE-Technologies B.V., Venlo (NE)

( * ) Notice: Subject to any disclaimer, the term of this patent is extended or adjusted under 35 U.S.C. 154(b) by 0 days.

(21) Appl. No.: 13/661,455

(22) Filed: Oct. 26, 2012

(65) Prior Publication Data
US 2013/0044950 A1 Feb. 21, 2013

Related U.S. Application Data

(63) Continuation of application No. PCT/EP2011/056630, filed on Apr. 27, 2011.

(30) Foreign Application Priority Data

May 10, 2010 (EP) .................................. 10162453

(51) Int. Cl.
G06K 9/00 (2006.01)
(52) U.S. Cl.
USPC ........... 382/167; 382/162; 382/194; 382/204; 382/221; 382/266
(58) Field of Classification Search
None
See application file for complete search history.

(56) References Cited

U.S. PATENT DOCUMENTS

| | | | |
|---|---|---|---|
| 4,183,013 A * | 1/1980 | Agrawala et al. ............. | 382/173 |
| 4,553,042 A | 11/1985 | Batterman | |
| 5,151,787 A * | 9/1992 | Park ............................... | 348/625 |
| 5,247,361 A * | 9/1993 | Izawa et al. .................... | 348/625 |
| 5,304,854 A * | 4/1994 | Aoki et al. ...................... | 327/170 |
| 5,936,681 A * | 8/1999 | Kameoka et al. .............. | 348/625 |
| 6,810,156 B1 * | 10/2004 | Itoh ................................ | 382/300 |
| 7,068,852 B2 | 6/2006 | Braica | |
| 7,098,964 B2 * | 8/2006 | Rieder et al. ................... | 348/627 |
| 7,200,278 B2 * | 4/2007 | Long et al. ..................... | 382/266 |
| 7,526,137 B2 * | 4/2009 | Ishizaka ......................... | 382/254 |
| 7,627,192 B2 * | 12/2009 | Yokochi ......................... | 382/261 |
| 7,672,526 B2 * | 3/2010 | Kondo et al. .................. | 382/254 |
| 7,912,323 B2 * | 3/2011 | Okuno et al. .................. | 382/300 |
| 7,986,841 B2 * | 7/2011 | Wang et al. .................... | 382/199 |
| 8,018,532 B2 * | 9/2011 | Tsuzuki ......................... | 348/625 |

(Continued)

FOREIGN PATENT DOCUMENTS

GB 2 320 834 A 7/1998

Primary Examiner — Anand Bhatnagar
Assistant Examiner — Alexander J Lesnick
(74) Attorney, Agent, or Firm — Birch, Stewart, Kolasch & Birch, LLP

(57) ABSTRACT

Restoration of edges in rasterized, continuous tone images includes selection of a pair of neighboring pixels that exchange a restoration value to make a steeper transition from a low value on one side of a boundary between the two pixels to a high value at the other side thereof. Although any pair of neighboring pixels is selected, this operation is only performed when four pixels in a direction perpendicular to the boundary, of which the selected pair form the two center pixels, have a monotonely increasing value. The restoration value is based on a difference value of nearest neighboring pixels on the same side of the boundary. This avoids overshooting around edges in an image. The method is advantageous when resealing an image to a higher resolution which occurs when a low resolution image is embedded in a page that is to be printed with a high addressability printer system.

10 Claims, 4 Drawing Sheets

(56) References Cited

U.S. PATENT DOCUMENTS

| | | | |
|---|---|---|---|
| 8,055,075 B1 * | 11/2011 | Tamura | 382/199 |
| 8,139,849 B2 * | 3/2012 | Miyagi et al. | 382/162 |
| 8,175,383 B2 * | 5/2012 | Shiraishi | 382/167 |
| 8,249,341 B2 * | 8/2012 | Ishiga | 382/167 |
| 8,265,416 B2 * | 9/2012 | Lin et al. | 382/266 |
| 8,306,352 B2 * | 11/2012 | Jung et al. | 382/266 |
| 8,396,315 B2 * | 3/2013 | Brajovic | 382/254 |
| 8,422,812 B2 * | 4/2013 | Moriya et al. | 382/254 |
| 2003/0189579 A1 * | 10/2003 | Pope | 345/660 |
| 2006/0020203 A1 * | 1/2006 | Tamura | 600/437 |
| 2007/0110319 A1 * | 5/2007 | Wyatt et al. | 382/199 |
| 2007/0177060 A1 | 8/2007 | Tsuzuki | |
| 2009/0180706 A1 * | 7/2009 | Huang | 382/266 |
| 2009/0245680 A1 * | 10/2009 | Maxwell et al. | 382/266 |

\* cited by examiner

METHOD TO RESTORE EDGES IN RASTERIZED IMAGES

This application is a Continuation of PCT International Application No. PCT/EP2011/056630 filed on Apr. 27, 2011, which claims priority to Patent Application No. 10162453.4 filed in Europe on May 10, 2010, all of which are hereby expressly incorporated by reference into the present application.

FIELD OF THE INVENTION

The invention relates to a method for the restoration of edges in continuous tone images having pixels, each pixel having a value, the method comprising the steps of selecting a pair of neighbouring pixels, the pair having a boundary between the two pixels, computing a difference value between values of pixels in the vicinity of the pair of neighbouring pixels, computing a restoration value based on the difference value, adding the restoration value to the highest pixel value of the selected pair and subtracting the restoration value from the lowest pixel value of the selected pair. The invention further relates to an electronic component and a printing system.

BACKGROUND OF THE INVENTION

In the state of the art, images are digitally represented in basically two ways. A first way is the description of graphic elements that constitute the image. For example, in case of a line, a description of its thickness, its colour, and the positions of the two end points is given. The descriptive elements that are used are part of a so-called page description language, such as PCL and PostScript. These images are generated for example by computer applications, such as word processing or computer aided design applications. A second way is the definition of pixels and the specification of the colour of these pixels in the amount of standard colorants. Each pixel is associated with a position in the image. An image having pixels is also known as a rasterized image. For a monochrome image, only one colorant is involved and the value of a pixel comprises one number, indicating the density of the pixel. If the image is a full colour image, each pixel is characterized by a combination of numbers, each indicating the density of the pixel in one of the colorants. For example, a combination of densities for red, green, and blue for each pixel characterizes an RGB image. In the same way a combination of densities for cyan, magenta, yellow, and black for each pixel forms a CMYK image. For image processing purposes these colour images may be viewed as the combination of several monochrome images, one for each colorant, that may be processed individually or jointly. These monochrome images are continuous tone images when the number of values a pixel can assume is large enough to represent all the relevant grey tones. Usually the 256 values for 8-bit pixels are considered to be sufficient for continuous tone images. Examples of rasterized, continuous tone images are images that stem from scanning a hardcopy original and images that originate from digital cameras. Combinations of these two image types also occur in mixed images that contain both descriptive elements, or vector elements, and rasterized images in the form of picture elements. It is noted that at the time of printing, images that comprise descriptive elements are often transposed into rasterized images by a Raster Image Processor.

Depending on the optical characteristics of the imaging device that generated the rasterized image, a digital image may need some processing in order to make it more suitable for the intended purpose. Especially in the case a digital image is printed, steep transitions in the amount of ink or toner that is deposited on the receiving material on one side of an edge relative to the other side, are preferred. In text rendering this enhances the straightness of the character lines and in pictures it enhances the perceived sharpness. Without processing the image may make a blurred impression. The same problem occurs when a continuous tone image is scaled to a larger size. This is e.g. the case when a mixed image comprises a picture element in a lower resolution than the resolution in which the complete image is rasterized. It may also occur when an image having vector elements is rasterized in a lower resolution than the addressability of the printer. E.g. when an image is rasterized to 300 pixels per inch (ppi) and a printer has an addressability of 600 dot per inch (dpi), one pixel has a value that is used for two dots, so the pixel is addressed twice.

The image processing for blurred images is well established. Image filtering comprising sharpening kernels are available in virtually every image processing application for personal computers. These comprise linear finite impulse response filters that generate a pixel value as a function of the original pixel value and the pixel values of pixels in the direct neighbourhood of the original pixel. A non-linear variant of a sharpening algorithm was described in U.S. Pat. No. 7,068,852. In this disclosure the difference between an average value of two groups of pixels at either side of a boundary between two pixels is the basis for adjusting the values of the pair of pixels adjacent to the boundary. A gain value depending on the magnitude of the difference value that has been found is used to tune the needed amount of sharpening in the processing step. The advantage over linear methods is a better restriction to edges. That means that other sequences of pixel values, like increasing values in smooth transition areas, are unaffected. A disadvantage of this non-linear method is the need for adjustment of the gain values that has to be made to select the degree of filtering.

Both types of filtering, linear and non-linear, have a tendency to show overshoot. This is the effect that when making the transition at the edge steeper, a number of pixels at a distance somewhat further from the boundary at the side where the pixel values are low, have a value that is below the intended value, and some of the pixels at a distance somewhat further from the boundary at the side where the pixel values are high, have a value that is above the intended value. When black text is rendered on a white background, this overshoot is welcomed, because pixel values beyond the limits of the available range of values are clipped and the resulting edge shows a steep transition from black to white. However, coloured text on a coloured background can not be processed in that way, because a halo of a different colour may appear between the text and the background. Also in pictorial images the overshoot is unwanted and the sharpening is limited to moderate operation. In the case of rescaled rasterized images a frequent cause of unsharpness is the occurrence of multiple pixels with an equal value that is intermediate of the high and low value at both sides of the edge. Also in this case overshoot as the result of enhancing the sharpness is unwanted, because this deteriorates the image compared with the unscaled image.

Therefore the problem of the present state of the art is the occurrence of overshoot. The invention has as its goal to find a sharpening algorithm that shows little or no overshoot.

SUMMARY OF THE INVENTION

According to the invention this problem may be solved by executing the step of adding and subtracting the restoration value only when four pixels in a line perpendicular to the boundary, of which the selected pair form the two center pixels, have a monotonely increasing value and the difference value is based on values of nearest neighbouring pixels on the same side of the boundary. The presumption of having an edge is based on the condition of finding four pixels having a monotonely increasing value. This condition eliminates the necessity of comparing a difference to a threshold to find the occurrence of an edge. Overshoot occurs when a pixel value is changed by a larger value than the difference of the pixel value and the value of its nearest neighbour. Therefore overshoot may be prevented by changing the pixel value with a value that is based on this difference. In this way a pixel value is limited by the value of its nearest neighbour and the amount of overshoot may be controlled.

In a further embodiment the restoration value is the minimum of a difference value between the values of the first two pixels of the four pixels in a line perpendicular to the boundary and a difference value between the values of the last two pixels of the four pixels in a line perpendicular to the boundary. Taking the minimum of the two difference values results in the complete elimination of overshoot, because the restoration value never exceeds the difference value between two neighbouring pixels.

In a further embodiment the step of adding and subtracting the restoration value is executed only when the restoration value is above a threshold value. This prevents the unnecessary execution of small corrections of the pixel values that may introduce unwanted noise in smooth transition areas.

In a further embodiment in the continuous tone image linewisely all pairs of neighbouring pixels are selected. By this feature a complete rasterized image may be processed into a digital image in which the transition from pixels with a high value to pixels with a low value is steeper than in the original image.

In another embodiment the restoration values of the selected pairs of neighbouring pixels in a single line of the image are saved in a line buffer, and are added to a corresponding pixel after an averaging operation. This has the further advantage that the original pixel values may be used for all selections of four pixels in a line without being changed by the restoration values of a previous selection.

The invention is also embodied in an electronic component configured as an application specific programming unit to apply one of the methods in claims 1 to 5. This embodiment has the advantage of a fast execution of the methods.

The invention is also embodied in a printing system, comprising a controller for interpreting images to be printed and a printing engine for marking an output material, wherein the controller comprises an image processing unit, characterized by the application of one of the methods of claims 1 to 5, giving the advantage of superior image quality.

DETAILED DESCRIPTION OF EMBODIMENTS

Figure 1:
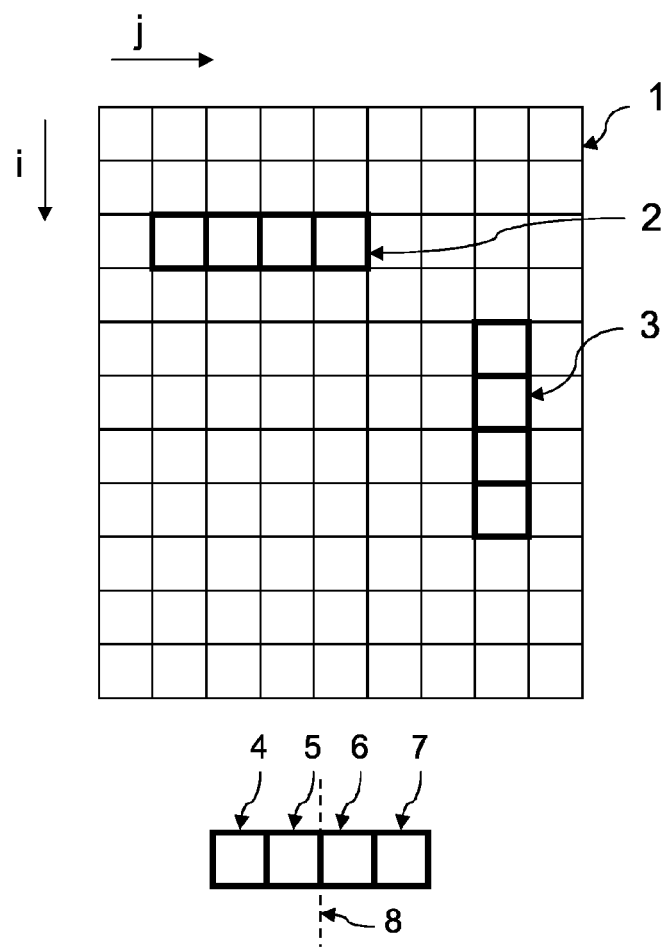
FIG. 1 is a schematic drawing of an image divided in pixels and possible orientations of pixels used in the described invention.

The embodiments will be illustrated using the Figures. In FIG. 1 a rectangular image is divided in pixels is shown. The pixels are ordered in lines (1) and may be numbered according to the line they are part of by an index i and their position in the line j. A pixel is associated with a position in the image and has a value that represents a property of the image at a specific position. In this embodiment this is the density of one of the colorants that is to be used to render the image. The invention processes four pixels in a row, in both perpendicular directions, (2) and (3). The pixels (5) and (6) represent a pair of neighbouring pixels that possibly exchange a restoration value when a boundary (8) is found between the two pixels. This is determined by the relative values of the pixels (4), (5), (6) and (7).

Figures 2A, 2B:
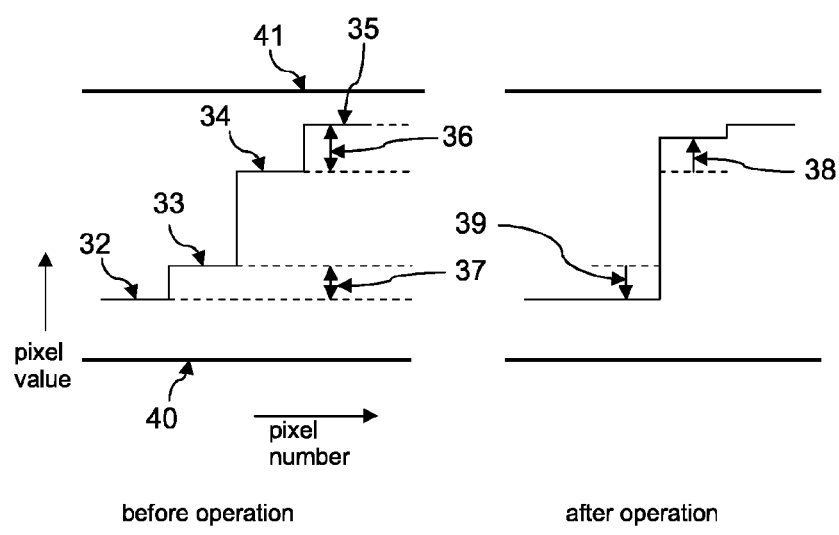
FIG. 2 is an illustration of pixel values before (A) and after (B) the invented operation.

In FIG. 2A the values of four adjacent pixels is depicted between the lower boundary (40) and upper boundary (41) for the values of the pixels before the method of the invention is applied. The values 32, 33, 34 and 35 are monotonely increasing and therefore a boundary between the pixels that belong to the values 33 and 34 is assumed. In this example, a restoration value is derived from the minimum of the difference between the values 32 and 33 (37) and the difference between the values 34 and 35 (36). FIG. 2B shows the result when the restoration value is added to the highest pixel value (38) of two center pixels and subtracted from the lowest value (39). The edge between the pixels is perceived steeper.

Figure 3:
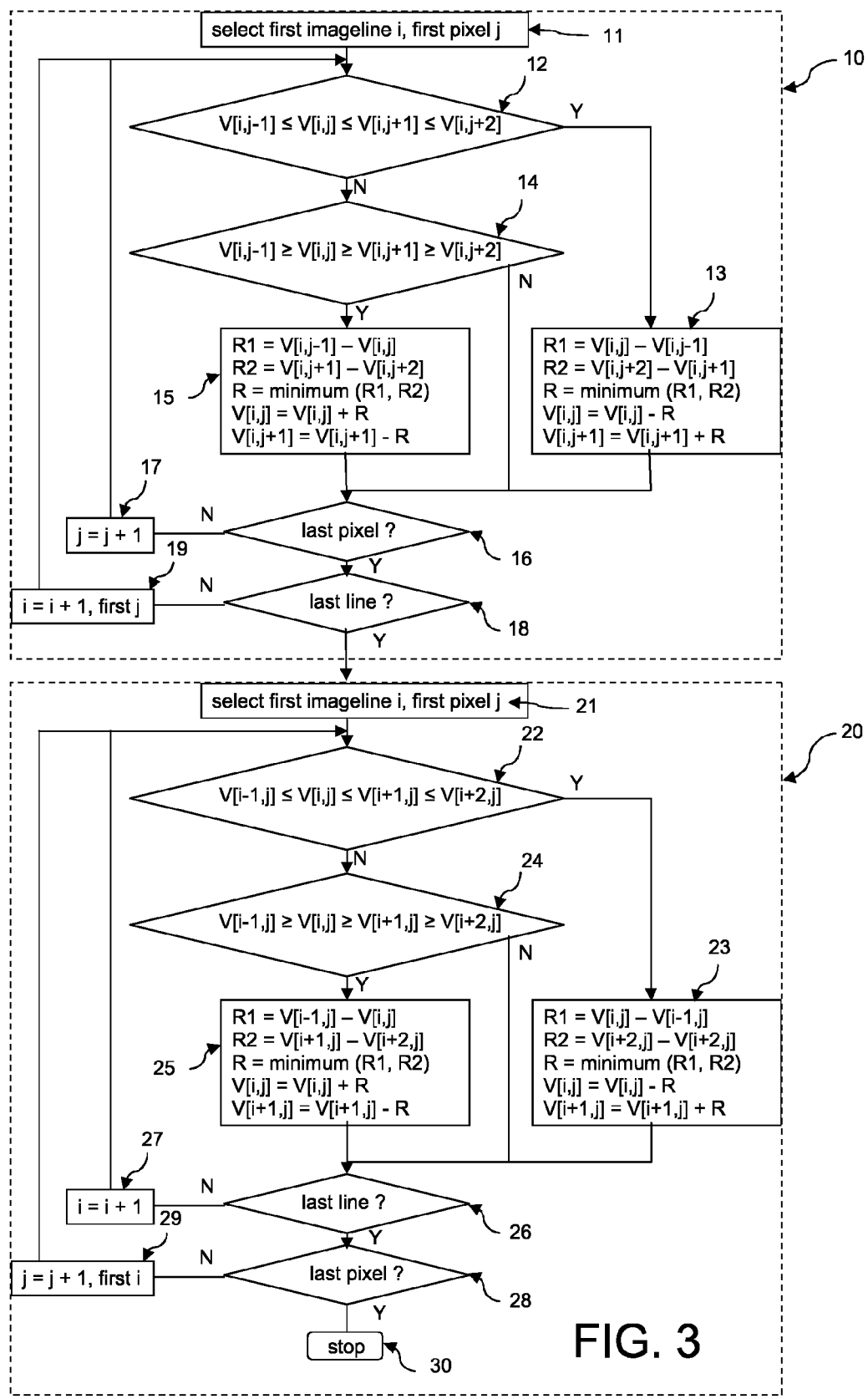
FIG. 3 is a flow diagram for the embodiment of processing an image in two directions.

In FIG. 3 a flow diagram showing the various steps of the method is shown as it is applied to a complete image. The pixels in the image are arranged in lines i and within the lines the pixel position is indicated by the index j. The value of a pixel associated with the position (i,j) is indicated by the variable V[i,j]. Two blocks of steps can be discerned. In the first block (10) groups of pixels in the direction of index j are processed, in the second block (20) groups of pixels in the direction of index i are processed. Since a number of pixels is involved in the method of the invention, it may be necessary to the start with a pixel that is somewhat distant to the border of the image.

It will be readily clear what starting values have to be taken (11). In the first block (10) the starting value of i is the value that indicates the first line, while the starting value of j indicates the first but one pixel. The last value of i indicates the last line of the image, while the last value of j indicates the last but two pixel of the image. In another embodiment a border of two pixels and two lines are left unprocessed to prevent interference with the border of the image. In the processing is determined if four adjacent pixels are monotoneously increasing (12). If this is the case (Y) a group of calculations (13) is performed in which a restoration value is determined which is subtracted from the lowest center pixel and added to the highest center pixel. If this is not the case (N) it is checked whether the four adjacent pixels are monotoneously decreasing (14). If this is the case (Y) another group of calculations (15) is performed in which a restoration value is determined, which is subtracted from the lowest center pixel and added to the highest center pixel. If this is not the case, no calculations are performed and the processing continues. The three processing paths come together and a check is made if the last pixel in the line has been processed (16). If this is not the case (N) the pixel index is raised by one (17) and the process loops to check the first condition (12). If it is the case (Y) a check is made if the last line has been processed. If this is not so (N), the process is repeated for the next line, starting with the first possible pixel (19). If this is so (Y), one block (10) is finished and a new block (20) is started. It is noted that in the calculation blocks (13), (15) values of pixels are changed that are used in subsequent steps, so each next group of adjacent pixels may comprise calculated values that are different from the original values in the image.

In block 20 similar processing steps as in block 10 are taken. In this block the first value of i indicates the first but one line, while the first value of j indicates the first pixel on the line. Similarly the last value of i indicates the last but two lines of the image and the last value of j indicates the last pixel in the line. First it is determined if the selected group of pixels is monotoneously increasing (22). If yes (Y), a group of calculations (23) will exchange a restoration value from the lowest to the highest value. If not (N), it is determined if the group of pixels is monotoneously decreasing (24). If this is the case (Y) another group of calculations (25) is performed in which a restoration value is determined, which is subtracted from the lowest center pixel and added to the highest center pixel. Also for this block the three processing paths come together to decide if all the lines have been processed (26). If not (N), the next line is selected by raising the index i by one (27) and the process is repeated for a next group of pixels. If all lines have been processed (Y), a determination is made if the last pixel has been processed (28). If not (N), the next pixel is selected (29) by raising the index j by one and the line index i starts again from the first value. If the last pixel has been processed, the method comes to an end.

Various other embodiments are possible to process the image according to the invention, where the order of the groups of pixels to be processed is concerned. In some situations it may be sufficient to process the pixels in one direction only, using only one of the blocks (10) and (20) in FIG. 3. In all these embodiments the results of the processed pixels are saved in place of the original pixels. This means that in a next processing step some pixels have values that have not been changed by a previous step, whereas other pixels may have obtained a new value.

Another embodiment of the invention circumvents this addressing of already processed pixels in a new processing step. For this purpose the restoration values that result from a group of pixels are saved in a buffer and a smoothing operation is imposed to the restoration values of groups of pixels that partially overlap. This is especially useful in a hardware embodiment as indicated in FIG. 4B. In such an embodiment it would be less efficient to replace the value of a pixel after processing before a next group of pixels is processed in a process that uses the new value of the pixel.

Figure 4A:
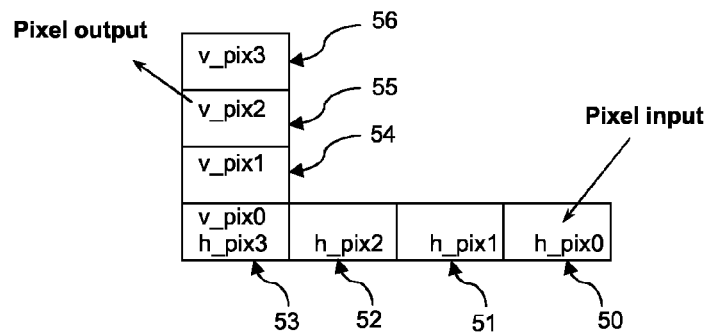
FIG. 4A shows the pixel positions of pixels involved in a hardware embodiment.
Figure 4B:
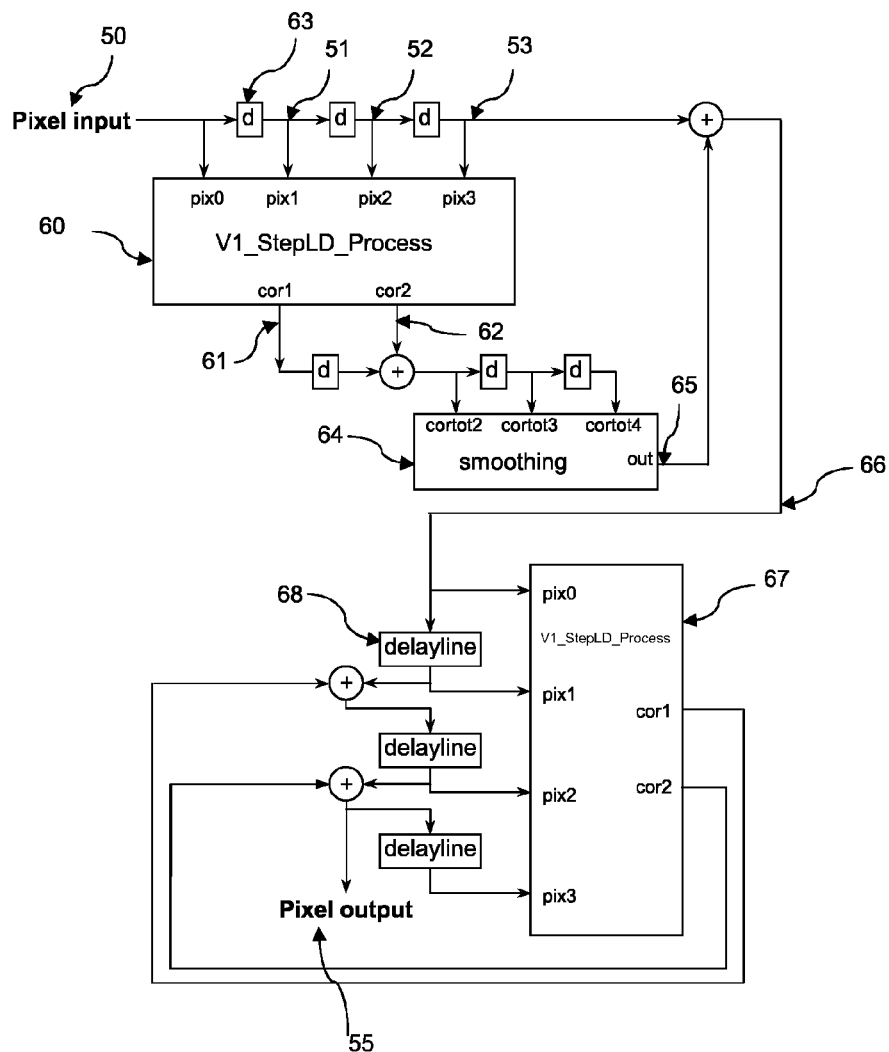
FIG. 4B is an hardware embodiment of the invention to process an image in two directions.

In FIG. 4A a group of four pixels in a horizontal direction is indicated and a group of four pixels in a vertical direction. These pixels are involved if the method is applied to an image starting from the upper left corner of the image to the lower right corner, horizontally line by line. In one pass both the horizontal and vertical processing steps are performed. In a circuit one pixel value (50) is the digital input value and one pixel value (55) is the output value. In FIG. 4B a schematic circuit that performs this process is shown. Not shown is a clock signal that is used to synchronize the various processes. In a digital signal processor (DSP) (60) the output values cor1 (61) and cor2 (62) are generated according to the method as illustrated in FIG. 2 using the input values pix0 (50), pix1 (51), pix2 (52), and pix3 (53). These last three signals are derived from the input signal by delaying the input signal by one, two and tree clock pulses (63) respectively. The output signal cor1 (61) is also delayed by one clock pulse and then added to the output signal cor2 (62). The result is used as the input signal for a smoothing circuit that produces an output (65) that is the average of the three input signals with the center input value taken twice. Furthermore the output signal (65) is set to zero when it is not of the same sign as the center input signal. The result is added to the signal that refers to pixel 53 and is used as the input signal for the next DSP (67) that processes a group of pixels in the vertical direction (53, 54, 55, 56). In this case the pixel values are delayed by the time it takes to process a complete line (68), since the image is processed in horizontal direction. The pixel output signal (55) is saved as the new value of the pixel that is three pixels to the left and two lines upwards of the input pixel (50). Note that in processing the vertical group of pixels the new value is used, so no smoothing is necessary.

Figure 5:
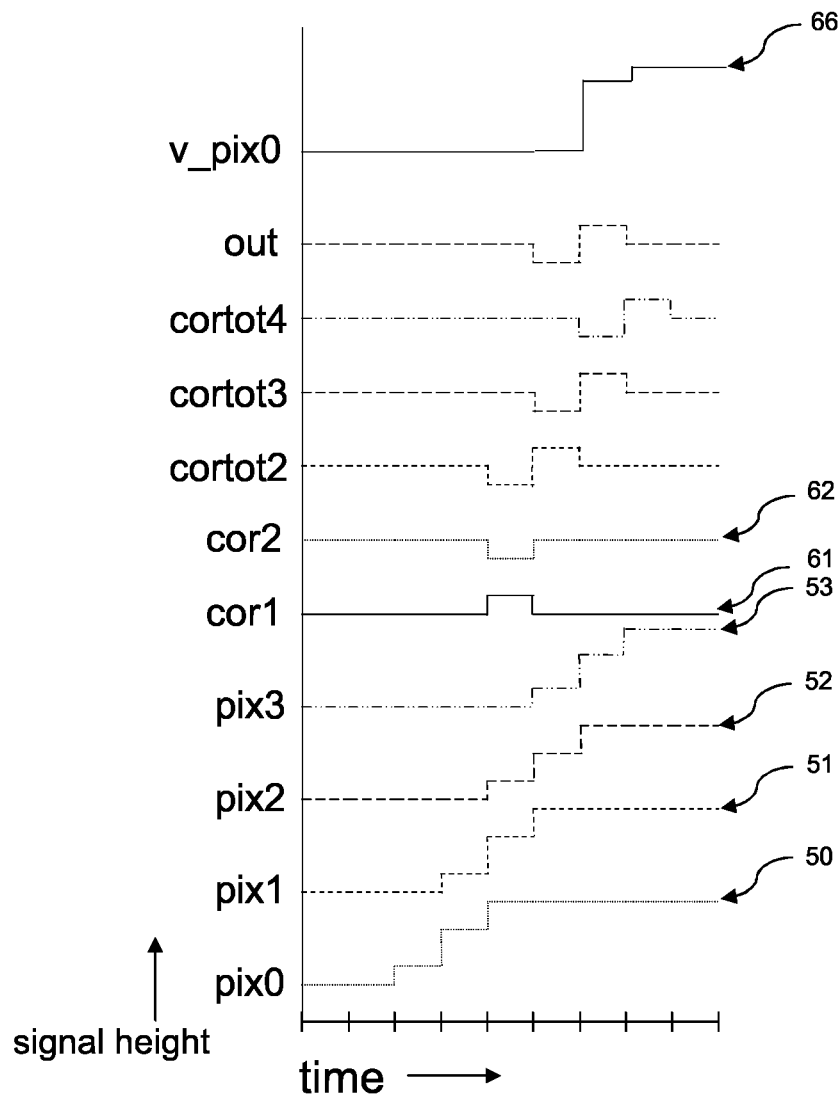
FIG. 5 shows a number of discrete-time signals illustrating the invention.

In FIG. 5 the discrete-time signals around the horizontal processing DSP (60) are shown for a pattern that starts with low values on one side of the image and ends with high values on the other side. The horizontal time axis shows nine periods which are separated by clock pulses. The vertical axis shows the signal height of ten signals using an offset to separate the various signals. The signal "pix0" refers to the value of the input signal to the DSP (60) that originates from the pixel "h_pix0" (50) in FIG. 4A. After a clock pulse the pattern of pixels in this Figure shifts one position to the right of the image. Therefore the input signal "pix1", associated with the value of pixel "h_pix1" (51) is delayed one clock pulse from the signal "pix0". A similar description applies to the signals "pix2" and "pix3". The DSP generates output values "cor1" (61) and "cor2" (62) according to the method of this application. The value of signal "cor1" (61) corresponds to the value R as determined in FIG. 3, calculation step (15), "cor2" (62) is the inverse of this signal. After delaying "cor1" by one clock pulse, it is added to "cor2", forming the first input signal "cortot2" to the smoothing processor (64). Note that for the pixel pattern in this example, the signals "cor1" (61) and "cor2" (62) are only different from zero during one time period. The smoothing processor adds the input signals "cortot2", "cortot3" and "cortot4", after doubling "cortot3", and checks whether the output signal "out" (65) is of the same sign as "cortot3". If not, the signal "out" is set to zero. Finally the signals "out" (65) and "pix3" (53) are added. The resulting signal "v_pix0" (66) has a steeper transition relative to the input signal without overshoot, according to the object of the invention.

The invention claimed is:

1. Method for the restoration of edges in continuous tone images having pixels, each pixel having a value, the method comprising the steps of
  selecting a pair of neighbouring pixels, the pair having a boundary between the two pixels;
  computing a difference value between values of pixels in the vicinity of the boundary between the pair of neighbouring pixels;
  computing a restoration value based on the difference value;
  adding the restoration value to the highest pixel value of the selected pair and subtracting the restoration value from the lowest pixel value of the selected pair,
  wherein the step of adding and subtracting the restoration value is executed only when four pixels in a line perpendicular to the boundary, of which the selected pair form the two center pixels, have a monotonely increasing value and wherein the difference value is based on values of nearest neighbouring pixels on the same side of the boundary.

2. Method according to claim 1, wherein the restoration value is the minimum of a difference value between the values of the first two pixels of the four pixels in a line perpendicular to the boundary and a difference value between the values of the last two pixels of the four pixels in a line perpendicular to the boundary.

3. Method according to claim 1, wherein the step of adding and subtracting the restoration value is executed only when the restoration value is above a threshold value.

4. Method according to claim 3, in which in the continuous tone image linewisely all pairs of neighbouring pixels are selected.

5. Method according to claim 4, in which restoration values for a specific pixel in a single line of the image are saved in a buffer until the specific pixel is not referenced anymore in the method, and the restoration values are added to the specific pixel after an averaging operation with the restoration values for neighbouring pixels.

6. Computer program product embodied on at least one non-transitory computer-readable storage medium comprising instructions for the execution of the method of claim 1.

7. Printing system, comprising a controller for interpreting images to be printed and a printing engine for marking a receiving material, wherein the controller comprises a data processing unit configured to perform the method according to claim 1.

8. Method according to claim 2, wherein the step of adding and subtracting the restoration value is executed only when the restoration value is above a threshold value.

9. Method according to claim 8, in which in the continuous tone image linewisely all pairs of neighbouring pixels are selected.

10. Method according to claim 9, in which restoration values for a specific pixel in a single line of the image are saved in a buffer until the specific pixel is not referenced anymore in the method, and the restoration values are added to the specific pixel after an averaging operation with the restoration values for neighbouring pixels.

* * * * *